United States Patent Office 2,789,863
Patented Apr. 23, 1957

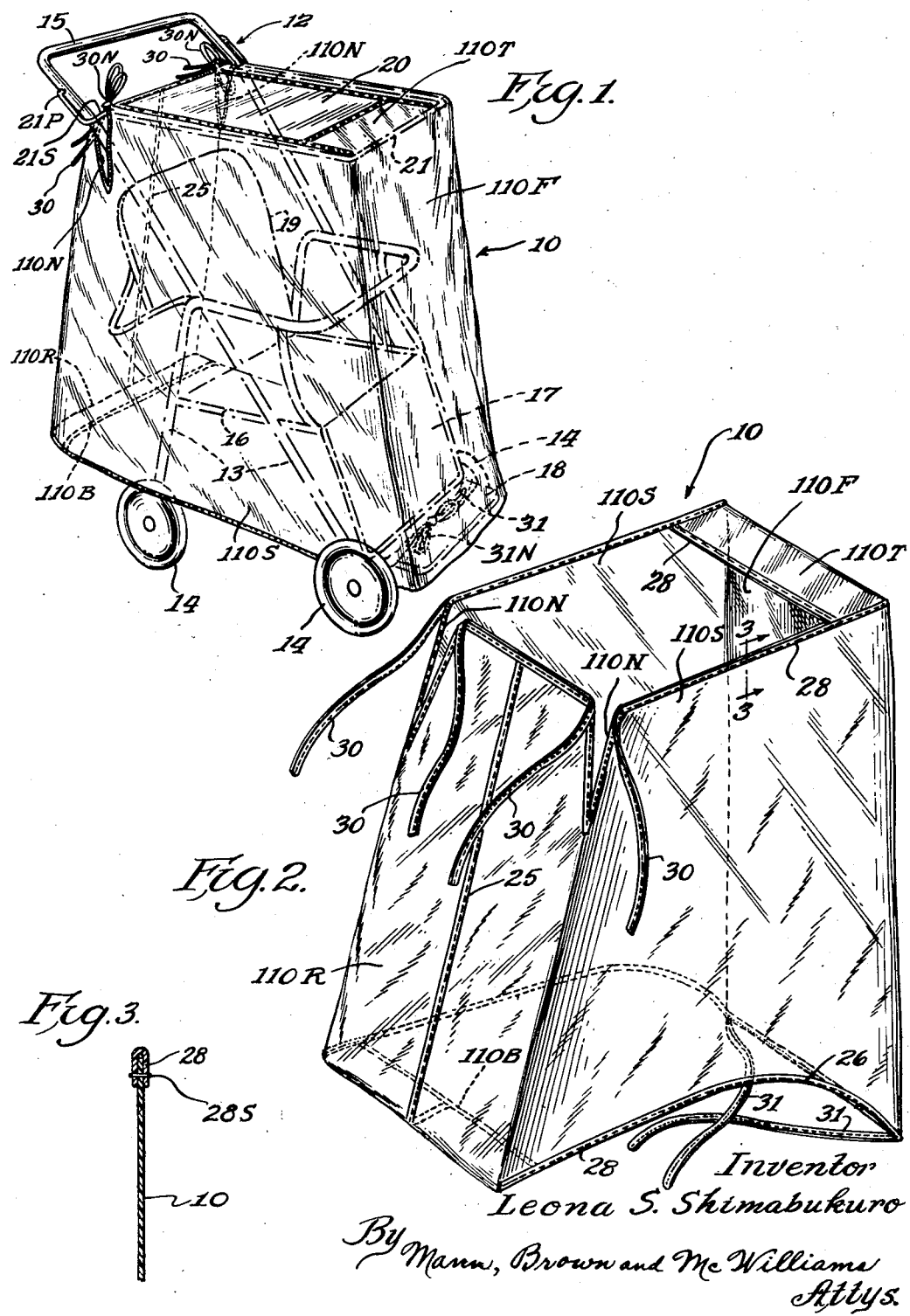

2,789,863
BABY STROLLER PROTECTORS

Leona S. Shimabukuro, Chicago, Ill., assignor to Harold Y. W. Kim, Chicago, Ill.

Application October 31, 1955, Serial No. 543,913

2 Claims. (Cl. 296—78)

This invention relates to baby stroller protectors and particularly to protectors that are adapted for use with baby strollers of the awning type.

Baby strollers of the awning type are arranged with a forwardly projecting awning mounted on an upper portion of the rearwardly projecting handle of the stroller so as to project forwardly over and in an upwardly spaced relationship with the seat of the stroller so that the awning may act as a sun shield and in some instances as a rain shield with respect to a baby riding in the stroller. It often happens, however, that the weather is such that the awning of such a stroller does not afford effective protection for the baby since the baby under such conditions would be subjected to winds, rain, snow and the like. It is therefore the primary object of the present invention to provide a baby stroller protector for baby strollers of the awning type and to embody such protectors in such a form that a protector may be readily applied to or removed from the stroller and may be stored or carried in the minimum space when not in use.

Other and further objects of the present invention will be apparent from the following description and claims, and are illustrated in the accompanying drawing, which by way of illustration, shows a preferred embodiment of the present invention and the principles thereof, and what I now consider to be the best mode in which I have contemplated applying these principles. Other embodiments of the invention embodying the same or equivalent principles may be used and structural changes may be made as desired by those skilled in the art without departing from the invention.

In the drawing:

Fig. 1 is a side perspective view of a baby stroller protector embodying the features of the invention and in its position of use on an awning type baby stroller;

Fig. 2 is a perspective view of the protector apart from the baby stroller on which it is used; and Fig. 3 is an enlarged cross sectional view taken substantially along the line 3—3 of Fig. 2.

For purposes of disclosure the invention is herein illustrated as embodied in a baby stroller protector 10 that is made from a thin flexible weather resistant material and preferably from a transparent plastic sheet so that it may be secured in a surrounding or embracing relationship with respect to a baby stroller 12 of the awning type such as that shown in Fig. 1 of the drawing, thus to form a protective enclosure for the stroller. The baby stroller 12 is of one of the more conventional forms of awning type baby strollers in that a tubular frame 13 supported on wheels 14 has a rearwardly projecting handle 15, and on the frame 13, a seat 16 is supported with downwardly extending footrest means 17 at its forward edge having a shelf 18 at its lower end, and having a back 19 extending rearwardly and upwardly from the rear edge of the seat 16. The back 19 and the footrest 17 in baby strollers of this type are conventionally adjustable so that the baby may be transported in either a reclining or a sitting position. The baby stroller 12 has an awning 20 projecting forwardly from an upper portion of the handle 15 and supported on a generally U-shaped rod-like frame 21 that is pivoted on the side elements of the handle 15 as at 21P. Shoulders 21S formed by bending of the rod-like frame 21 provide for supporting the awning 20 in a forwardly projecting horizontal position while at the same time allowing the awning 20 to be pivoted rearwardly to an out-of-the-way position.

The baby stroller protector 10 of the present invention is adapted for mounting on and cooperation with baby strollers of the general form and construction embodied in the stroller 12, and to this end, the baby stroller protector 10 is formed from a transparent plastic sheet material to provide a forward wall 110F, side walls 110S and a rear wall 110R, and these walls in the form herein shown are made from a single sheet of material that is joined along a vertical seam 25 that extends down the rear wall 110R midway between the edges thereof. The front and rear walls 110F and 110R are substantially rectangular in form while the side walls 110S have a somewhat trapezoidal form in that they are of gradually increasing width from top to bottom. The front wall 110F is somewhat longer than the rear wall 110R and the lower edges of the side walls 110S are therefore curved downwardly as at 26 near their forward edges so as to terminate at the lower end edge of the front wall 110F.

The upper edge of the front wall 110F has a relatively narrow rearwardly projecting supporting panel 110T formed thereon which is joined at its side edges to the upper edges of the side walls 110S, and a narrow forwardly projecting panel 110B is provided at the lower edge of the rear wall 110R so as to project forwardly therefrom in a generally horizontal plane. The edges of the bottom panel 110B are joined to the adjacent lower edges of the side walls 110S.

The side walls 110S are connected throughout their entire vertical length to the front wall 110F, while at their rear edges the side walls 110S are connected to the rear wall 110R through a substantial portion of their vertical length extending from the bottom end upwardly to a point spaced downwardly from the upper edges of the side and rear walls. This forms vertical slots 110N at both of the upper rear corners of the protector 10 and these slots 110N are utilized in the mounting of the protector 10 on the stroller 12 as will be described.

Along the edges of the various walls and along the edges of the slots 110N, a reinforced edge seam 28 is provided by an extra piece of material stitched over the edges at 28S so as to enable relatively thin plastic sheet material to be used without danger of tearing, and the reinforcing material that is thus used is also employed in providing cooperating attaching means at the open ends of the slots 110N and at the forward lower corners of the protector 10. Thus, at each upper end edge of the slots 110N, tie strings 30 are provided by extensions of the edge seam reinforcing material, and at the opposite lower corners of the front wall 110F, tie strings 31 are similarly provided.

With the construction that is thus afforded, the protector 10 may be readily mounted on or removed from a baby stroller 12. This is done by slipping the cover 10 downwardly over the handle 15 and the awning 20 of the stroller until the top retaining panel 110T rests upon the upper surface of the forward portion of the awning 20. The upper portion of the back wall 110B, that is the material of the back wall that is located between the slots 110N, is of course freely bendable so that ample clearance is provided to enable the protector to be manipulated downwardly over the handle 15 and into the position just described. The tie strings 30 from the side walls 110S are then extended rearwardly over the rear edge portion of the awning 20 and the tie strings 30 from the rear wall are drawn upwardly on the rear edge of the awning so that each slot 110N embraces or encircles the adjacent side portions of the handle 15 and the rear portions of the frame 21 of the awning 20, and the ends of the adjacent tie strings 30 are connected together by bow knots 30N.

Similarly, the lower edge of the front wall 110F may be secured in its proper position on the step portion 18 of the footrest 17, and this may be done by extending the tie strings 31 inwardly across the upper surface of the step 18 and tieing the same as by a bow knot 31N. In this respect it will be observed that the user may do this by extending the hands and arms beneath the lower edges of the side walls 110S and inwardly just above the step 18. As an alternative, the lower end of the front wall 110F may be folded under the step 18 and the tie strings 31 may be drawn about the edges of the step and may then be tied outside of the front wall 110F so as to hold a portion of such front wall flat against the top of the step.

With the protector 10 thus secured in position, the front, side and rear walls extend downwardly about all of the four sides of the stroller, thus to effectually protect the baby from wind, rain and the like. It will be observed that the dimension between the upper edges of the side walls 110S is preferably somewhat less than the width of the awning 20 of the stroller, thus to cause the upper edges of the side walls 110S to be drawn for a short distance over the top of the awning 20 along the side edges thereof. Then, by attaching the rear edges of the side walls 110S by means of the tie strings 30 so as to draw the side walls rearwardly into a taut relation, an effectual weather seal is afforded along the upper edges of the side walls 110S.

When the back 19 of the stroller is lowered, it will be evident that the extreme rear edge of the back 19 will overlie the narrow panel 110R, thus to assure that the rear wall 110R remains in its proper protecting relationship.

When the stroller is to be opened for placing the baby in the stroller, the knot 31N is untied and the forward wall 110F and the connected portions of the side walls 110S are lifted and drawn back over the top of the awning 20. The baby may then be put in place, and if desired the awning may be pivoted upwardly to an out-of-the-way position and in such movement will further displace the protector 10 and will thus give further clearance space through which the baby may be moved into position in the stroller. The forward portion of the stroller protector 10 may then be moved downwardly and may be secured in protecting position by means of the ties 31 as shown in Fig. 1 of the drawing.

The stroller protector that is thus provided may of course be folded or rolled into a compact package that may be carried in the purse or may be tied on to a part of the stroller such as the horizontal upper portion of the handle 15.

From the foregoing description it will be apparent that the invention provides a highly advantageous protector for baby strollers of the awning type, and that this protector may be readily put in place so as to afford protection for the baby against the elements. Moreover, the protector of this invention is adapted to cooperate effectually with the normal parts of such a baby stroller and may be packed and carried in a small size package so as to be readily available when needed.

Thus, while I have illustrated and described a preferred embodiment of the invention, it will be apparent that this may be altered and modified by those skilled in the art without departing from the invention.

I claim:

1. A protector for awning type baby strollers comprising an enclosure formed from thin sheet material to provide vertical front, rear and side walls with their upper edges disposed substantially in a common plane and connected along their vertical edges, said enclosure having a narrow panel extended rearwardly from the upper edge of the front wall in position to rest and be supported on the forward portion of the awning of such a stroller and said panel being connected at its end edges to adjacent upper edges of the respective side walls, said rear wall and said side walls being separated for a substantial distance downwardly from their upper edges to provide slots that may embrace the handle portions of a stroller, a second panel extending between the lower rear edges of said side walls and connected to the lower edge of said rear wall in position to engage the rear edge of the back of such a stroller when the back is lowered to thereby retain such rear wall in protecting position, and cooperating fastening means at the opposed sides of said slots for securing said protector to the handle portions of a stroller.

2. A protector for use on awning type baby strollers comprising an enclosure formed from thin sheet material to provide vertical front, rear and side walls connected along their vertical edges and having a rearwardly extending supporting panel connected to upper forward portions of said side walls and to said front wall in position to rest on and be supported by the forward portion of the awning of such a stroller, said rear wall and said side walls being separated for a substantial distance downwardly from their upper edges to provide slots that may embrace the handle portions of a stroller, cooperating fastening means at the lower corners of said front wall for detachably securing said front wall to the footrest of such a stroller, a second panel extending between the lower rear edges of said side walls and connected to the lower edge of said rear wall in position to engage the rear edge of the back of such a stroller when the back is lowered to thereby retain such rear wall in protecting position, and cooperating fastening means at the opposed sides of said slots for securing the rear portions of said protector on a stroller.

References Cited in the file of this patent

UNITED STATES PATENTS

| 916,439 | Grover | Mar. 30, 1909 |
| 1,037,572 | Adams | Sept. 3, 1912 |
| 2,218,043 | Lilleberg | Oct. 15, 1940 |

FOREIGN PATENTS

| 154,539 | Australia | Dec. 16, 1953 |